(12) United States Patent
Yamato et al.

(10) Patent No.: US 10,825,035 B2
(45) Date of Patent: Nov. 3, 2020

(54) POINT CALCULATION DEVICE, BOAT, POINT CALCULATION METHOD, AND PROGRAM

(71) Applicant: MITSUBISHI SHIPBUILDING CO., LTD., Yokohama (JP)

(72) Inventors: Kuniaki Yamato, Tokyo (JP); Ryoichi Takei, Tokyo (JP); Shinichi Taniguchi, Tokyo (JP); Tohta Kasai, Tokyo (JP)

(73) Assignee: MITSUBISHI SHIPBUILDING CO., LTD., Yokohama (JP)

( * ) Notice: Subject to any disclaimer, the term of this patent is extended or adjusted under 35 U.S.C. 154(b) by 423 days.

(21) Appl. No.: 15/518,763

(22) PCT Filed: Jul. 30, 2015

(86) PCT No.: PCT/JP2015/071646
§ 371 (c)(1),
(2) Date: Apr. 13, 2017

(87) PCT Pub. No.: WO2016/059848
PCT Pub. Date: Apr. 21, 2016

(65) Prior Publication Data
US 2017/0236138 A1    Aug. 17, 2017

(30) Foreign Application Priority Data

Oct. 15, 2014    (JP) ................. 2014-210439

(51) Int. Cl.
*G06Q 30/02*    (2012.01)
*G01C 22/00*    (2006.01)
(Continued)

(52) U.S. Cl.
CPC ......... *G06Q 30/0207* (2013.01); *G01C 21/00* (2013.01); *G01C 22/00* (2013.01);
(Continued)

(58) Field of Classification Search
CPC ....................................................... G06Q 30/00
See application file for complete search history.

(56) References Cited

U.S. PATENT DOCUMENTS 5,068,656 A * 11/1991 Sutherland ............. G08G 1/127
340/989
2003/0203754 A1    10/2003 Fujimoto et al.
(Continued)

FOREIGN PATENT DOCUMENTS

JP    2002-133017 A    5/2002
JP    2002-304563 A    10/2002
(Continued)

OTHER PUBLICATIONS

K. Steinberg, Nathen. "Do You Earn Extra Elite Qualifying Miles if Your Flight is Diverted?", The Points Guy, Mar. 28, 2019. https://thepointsguy.com/news/extra-elite-qualifying-miles-flight-diversions/ Accessed on Jun. 16, 2020.: (Year: 2019).*
(Continued)

*Primary Examiner* — Eric R Netzloff
(74) *Attorney, Agent, or Firm* — Kanesaka Berner and Partners LLP

(57) ABSTRACT

A point calculation device includes an actual movement route calculation unit configured to calculate an actual movement route of a vehicle from departure to arrival, and a point calculation unit configured to calculate use points according to a difference between the actual movement route and a preset movement route from a departure location to an arrival location.

16 Claims, 7 Drawing Sheets

(51) Int. Cl.
  *G06Q 10/10* (2012.01)
  *G01C 22/02* (2006.01)
  *G06Q 50/30* (2012.01)
  *G01C 21/00* (2006.01)
(52) U.S. Cl.
  CPC ......... *G01C 22/02* (2013.01); *G06Q 10/1095* (2013.01); *G06Q 50/30* (2013.01)

(56) References Cited

U.S. PATENT DOCUMENTS

| | | | | |
|---|---|---|---|---|
| 2003/0233278 A1* | 12/2003 | Marshall | ............... | G06Q 30/00 705/14.35 |
| 2005/0278215 A1* | 12/2005 | Seele, Jr. | ............... | G06Q 30/02 705/14.19 |
| 2008/0189226 A1* | 8/2008 | Wurster | ............... | G06Q 10/06 705/417 |
| 2008/0255714 A1* | 10/2008 | Ross | ............... | G01S 7/003 701/14 |
| 2009/0106101 A1* | 4/2009 | Green | ............... | G06Q 10/08 705/14.23 |
| 2009/0259549 A1* | 10/2009 | Winand | ............... | G06Q 10/08 705/14.35 |
| 2010/0197325 A1* | 8/2010 | Dredge | ............... | H04W 4/02 455/456.3 |
| 2012/0130727 A1* | 5/2012 | Ahmed | ............... | G06Q 30/02 705/1.1 |
| 2014/0304076 A1* | 10/2014 | Baca | ............... | G06Q 30/0207 705/14.58 |

FOREIGN PATENT DOCUMENTS

| | | |
|---|---|---|
| JP | 2004-206176 A | 7/2004 |
| JP | 2004-295521 A | 10/2004 |
| KR | 10-2011-0101535 A | 9/2011 |

OTHER PUBLICATIONS

Korea Patent Office, "Office Action for Korean Patent Application No. 10-2017-7009978," dated Jan. 9, 2018.
Internet posted writing "the collaboration airline flight, and load can send," Jul. 21, 2011, <source: http://www.hansfamily.kr/1126>.
PCT/ISA/210, "International Search Report for International Application No. PCT/JP2015/071646," dated Nov. 2, 2015.
PCT/ISA/237 "Written Opinion of the International Searching Authority for International Application No. PCT/JP2015/071646," dated Nov. 2, 2015.
"2-1 Unchin no Keisan Hoho Kokusai Koku Unchin Keisan Kaigai Ryoko Jitsumu Travel-Supervisor.net," [online] Apr. 25, 2014, [retrieval date: Oct. 21, 2015], Internet<URL:http://web.archive.org/web/20140425050930/http://Travel-supervisor.net/abroad/calculation/calculation.php?sec=1&page=1>.
"Practical Dictionary of Aviation Terms," [online] Oct. 26, 2013, [retrieval date: Oct. 22, 2015], Internet: <URL: http://web.archive.org/web/20131026230417http://www.jal.com/ja/jiten/dict/p308.html>.
"American Airlines AAdvantage Elite Status Benefits," [online] Jul. 14, 2014, [retrieval date: Oct. 26, 2015], Internet: <URL:http://web.archive.org/web/20140714145517http://www.aa.com/i18n/AAdvantage/elitestatus/elite-benefits-chart.isp>.
Ogata, S., "Taifu Oame Oyuki . . . Hikoki no Kekko ya Chien wa Dokomade Hosho shite Kureru?" [online] Aug. 11, 2014, [retrieval date: Oct. 26, 2015], Internet<URL://http://web.archive.org/web/20140811101638/http://news.mynavi.jp/articles/2014/07/09/airline/>.

* cited by examiner

FIG. 4

| POINT ID | EMBARKATION PORT | EMBARKATION TIME | DISEMBARKATION PORT | DISEMBARKATION TIME | PASSENGER ROOM GRADE | OPERATION ID |
|---|---|---|---|---|---|---|
| 123456 | PORT A | YYYY/MM/DD hh:mm:ss1 | PORT C | YYYY/MM/DD hh:mm:ss2 | FIRST GRADE | 001 |
| ... | ... | ... | ... | ... | ... | ... |

| OPERATION ID | BRANCH NUMBER | VESSEL TYPE | DEPARTURE PORT | SCHEDULED PORT DEPARTURE TIME | PORT DEPARTURE TIME | ARRIVAL PORT | SCHEDULED PORT ARRIVAL TIME | PORT ARRIVAL TIME | STANDARD MOVEMENT DISTANCE | ACTUAL MOVEMENT DISTANCE |
|---|---|---|---|---|---|---|---|---|---|---|
| 001 | 01 | NO. XXX | PORT A | YYYY/MM/DD hh:mm:ss3 | YYYY/MM/DD hh:mm:ss4 | PORT B | YYYY/MM/DD hh:mm:ss5 | YYYY/MM/DD hh:mm:ss6 | ZZZ1 | ZZZ2 |
| 001 | 02 | NO. XXX | PORT B | YYYY/MM/DD hh:mm:ss7 | YYYY/MM/DD hh:mm:ss8 | PORT C | YYYY/MM/DD hh:mm:ss9 | YYYY/MM/DD hh:mm:ss10 | ZZZ3 | ZZZ4 |
| 001 | 03 | NO. XXX | PORT C | YYYY/MM/DD hh:mm:ss11 | YYYY/MM/DD hh:mm:ss12 | PORT D | YYYY/MM/DD hh:mm:ss13 | YYYY/MM/DD hh:mm:ss14 | ZZZ5 | ZZZ6 |

| CONDITION | GRANTED POINTS |
|---|---|
| PORT A TO PORT B | 100 POINTS |
| PORT B TO PORT C | 120 POINTS |
| PORT C TO PORT D | 80 POINTS |
| MOVEMENT DISTANCE | 5 POINTS PER km |
| DEPARTURE DELAY | 5 POINTS PER MINUTE |
| ARRIVAL DELAY | 10 POINTS PER MINUTE |
| EMBARKATION TIME PERIOD | 1 POINT PER MINUTE |
| T km OR MORE | 30 POINTS |
| FIRST GRADE ROOM | 10 POINTS |
| FOUR OR MORE PERSONS | 5 POINTS |
| NAVIGATION CANCELLATION | 10 POINTS |
| EMBARKATION RATIO OF 90% OR MORE | 5 POINTS |
| NUMBER OF EMBARKATIONS | 1 POINT PER EMBARKATION |
| CARD GRADE (1ST) | 5 POINTS |
| CARD GRADE (2ND) | 10 POINTS |
| CARD GRADE (3RD) | 20 POINTS |
| PORT SKIP | 10 POINTS |
| RETURN | 10 POINTS |

| POINT ID | NAME | CONTACT INFORMATION | ACCUMULATED NUMBER OF POINTS | VALIDITY PERIOD | CARD GRADE |
|---|---|---|---|---|---|
| 123456 | XX XX | TOKYO ~ | 1000 | YYYY/MM/DD | 1st |
| ... | ... | ... | ... | ... | ... |

POINT CALCULATION DEVICE, BOAT, POINT CALCULATION METHOD, AND PROGRAM

RELATED APPLICATIONS

The present application is a National Phase of International Application Number PCT/JP2015/071646, filed Jul. 30, 2015.

TECHNICAL FIELD

The present invention relates to a point calculation device, a boat, a point calculation method, and a program.

Priority is claimed on Japanese Patent Application No. 2014-210439, filed Oct. 15, 2014, the content of which is incorporated herein by reference.

BACKGROUND ART

Airline companies are converting flight distances of passengers using airplanes into points, storing the points, and providing services for providing the passengers with benefits such as free air tickets in accordance with the accumulated points. This service can be used in other means of movement. In the ferry industry, for example, a service of putting a stamp on a stamp card for each embarkation and discounting an embarkation fare when a predetermined number of stamps are accumulated is carried out. Also, Patent Document 1 discloses that a mileage system, which has been limited to the airline industry, is extended to other vehicle and that points according to a movement distance by each means of movement are granted even when a user uses various transportation facilities such as a train and a bus. Also, it is disclosed that more points are granted when a vehicle that is less environmentally burdensome is used and a contribution to environmental improvement is provided by promoting the use of public transportation facilities and a less polluting vehicle.

CITATION LIST

Patent Literature

[Patent Document 1]
Japanese Unexamined Patent Application, First Publication No. 2002-304563

SUMMARY OF INVENTION

Technical Problem

Incidentally, when the means of movement is a boat such as, for example, a ferry, a difference in a navigation distance may occur due to weather or the like even when a passenger embarked on the boat in the same section. For example, if only the same points as those of an ordinary time are granted because the passenger embarks on the boat in the same section when the boat arrives at a port after taking a detour due to rough seas, dissatisfaction of the passenger will remain. However, because an actual embarkation distance is not taken into consideration in a conventional point granting method, dissatisfaction of this passenger cannot be solved. The same is also true for other vehicles.

Also, the method described in Patent Document 1 does not solve this problem.

The present invention provides a point calculation device, a boat, a point calculation method, and a program capable of solving the above-described problems.

Solution to Problem

According to a first aspect of the present invention, a point calculation device includes an actual movement distance calculation unit configured to calculate an actual movement distance of a vehicle from departure to arrival; and a point calculation unit configured to calculate first use points for the vehicle according to a difference between the actual movement distance and a preset movement distance from a departure location to an arrival location.

According to a second aspect of the present invention, the preset movement distance is a distance when movement on a preset route from the departure location to the arrival location has been performed.

According to a third aspect of the present invention, the preset movement distance is a distance when movement on a predetermined route movable within a region having a predetermined width on both sides of the predetermined route has been performed using a preset route from the departure location to the arrival location as a center.

According to a fourth aspect of the present invention, the actual movement distance calculation unit calculates a total movement distance outside the region of movement from the departure location to the arrival location, and the point calculation unit calculates the first use points according to the calculated total movement distance outside the region.

According to a fifth aspect of the present invention, the actual movement distance calculation unit calculates the actual movement distance by integrating a speed of the vehicle.

According to a sixth aspect of the present invention, the actual movement distance calculation unit calculates the actual movement distance according to a trajectory of a position of the vehicle.

According to a seventh aspect of the present invention, the actual movement distance calculation unit calculates a movement distance in an up-down direction in addition to a movement distance in a plane direction from the departure to the arrival in the calculation of the actual movement distance and adds the calculated movement distance in the up-down direction to the movement distance in the plane direction.

According to an eighth aspect of the present invention, the point calculation unit calculates points according to a sum value of differences between the preset movement distance and actual movement distances at use times of the vehicle for a predetermined period.

According to a ninth aspect of the present invention, the point calculation unit adds second use points calculated according to a time difference between a scheduled arrival time of the vehicle and an arrival time of the vehicle to the first use points.

According to a tenth aspect of the present invention, the point calculation unit adds second use points calculated according to a time difference between a scheduled departure time of the vehicle and a departure time of the vehicle to the first use points.

According to an eleventh seventh aspect of the present invention, the point calculation unit adds second use points calculated according to a time difference between a boarding time of the vehicle and a departure time of the vehicle to the first use points.

According to a twelfth aspect of the present invention, the point calculation unit adds second use points calculated according to a time difference between a deboarding time from the vehicle and an arrival time of the vehicle to the first use points.

According to a thirteenth aspect of the present invention, the point calculation unit adds second use points calculated according to at least one of a grade of a card in which identification information of a user is recorded to be used by the user to record boarding on the vehicle, a grade of a passenger room used by the user in the vehicle, the number of times that the user boards the vehicle, the number of users pre-registered as users on board with the user when he/she boards the vehicle, a level of crowdedness of the vehicle in a section in which the user boards the vehicle, and a case in which the user has not deboarded the vehicle at a scheduled deboarding place to the first use points.

According to a fourteenth aspect of the present invention, the point calculation unit calculates points for a case in which the vehicle is not operated when the vehicle is not operated.

According to a fifteenth aspect of the present invention, the point calculation device further includes a shaking determination unit configured to acquire detection information of a vibration sensor mounted on the vehicle or weather information and determine a shaking of the vehicle according to the acquired information, wherein the point calculation unit adds second use points calculated according to a time period during which the shaking determination unit determines that the vehicle is in a shaken state to the first use points.

According to a sixteenth aspect of the present invention, the point calculation unit acquires a speed of the vehicle from the departure location to the arrival location of the vehicle at predetermined time intervals, calculates a distance of movement at a speed greater than or equal to a predetermined threshold value, and adds second use points calculated according to the distance to the first use points.

According to a seventeenth aspect of the present invention, the point calculation unit determines, as the number of first use points, a value obtained by subtracting a predetermined value from the number of first use points calculated according to the difference between the preset movement distance and the actual movement distance when a difference between a scheduled departure time and a departure time of the vehicle is less than or equal to a predetermined threshold value and a difference between a scheduled arrival time and an arrival time of the vehicle is less than or equal to a predetermined threshold value.

According to an eighteenth aspect of the present invention, the point calculation device further includes an output unit configured to output the first use points calculated by the point calculation unit, wherein, when the point calculation unit has calculated the second use points, the output unit outputs the second use points in addition to the first use points by distinguishing the second use points from the first use points.

According to a nineteenth aspect of the present invention, a boat includes the point calculation device according to any one of the above-described aspects.

According to a twentieth aspect of the present invention, a point calculation method includes calculating, by a point calculation device, an actual movement distance of a vehicle from departure to arrival; and calculating, by the point calculation device, use points for the vehicle according to a difference between the actual movement distance and a preset movement distance from a departure location to an arrival location.

According to a twenty-first aspect of the present invention, a program causes a computer of a point calculation device to function as: a calculator configured to calculate an actual movement distance of a vehicle from departure to arrival; and a calculator configured to calculate use points for the vehicle according to a difference between the actual movement distance and a preset movement distance from a departure location to an arrival location.

Advantageous Effects of Invention

According to the point calculation device, the boat, the point calculation method, and the program described above, it is possible to grant points according to a distance of a boat on which a user has actually embarked. Also, it is possible to provide advantageous information for each user based on a boarding record, contact information, and the like for each user.

BRIEF DESCRIPTION OF DRAWINGS

FIG. 4 is a first diagram showing an example of a table used in point calculation in the first embodiment according to the present invention.

FIG. 5 is a second diagram showing an example of a table used in point calculation in the first embodiment according to the present invention.

FIG. 6 is a third diagram showing an example of a table used in point calculation in the first embodiment according to the present invention.

DESCRIPTION OF EMBODIMENTS

First Embodiment

Hereinafter, a point calculation device according to the first embodiment of the present invention will be described with reference to FIGS. 1 to 8.

Figure 1:
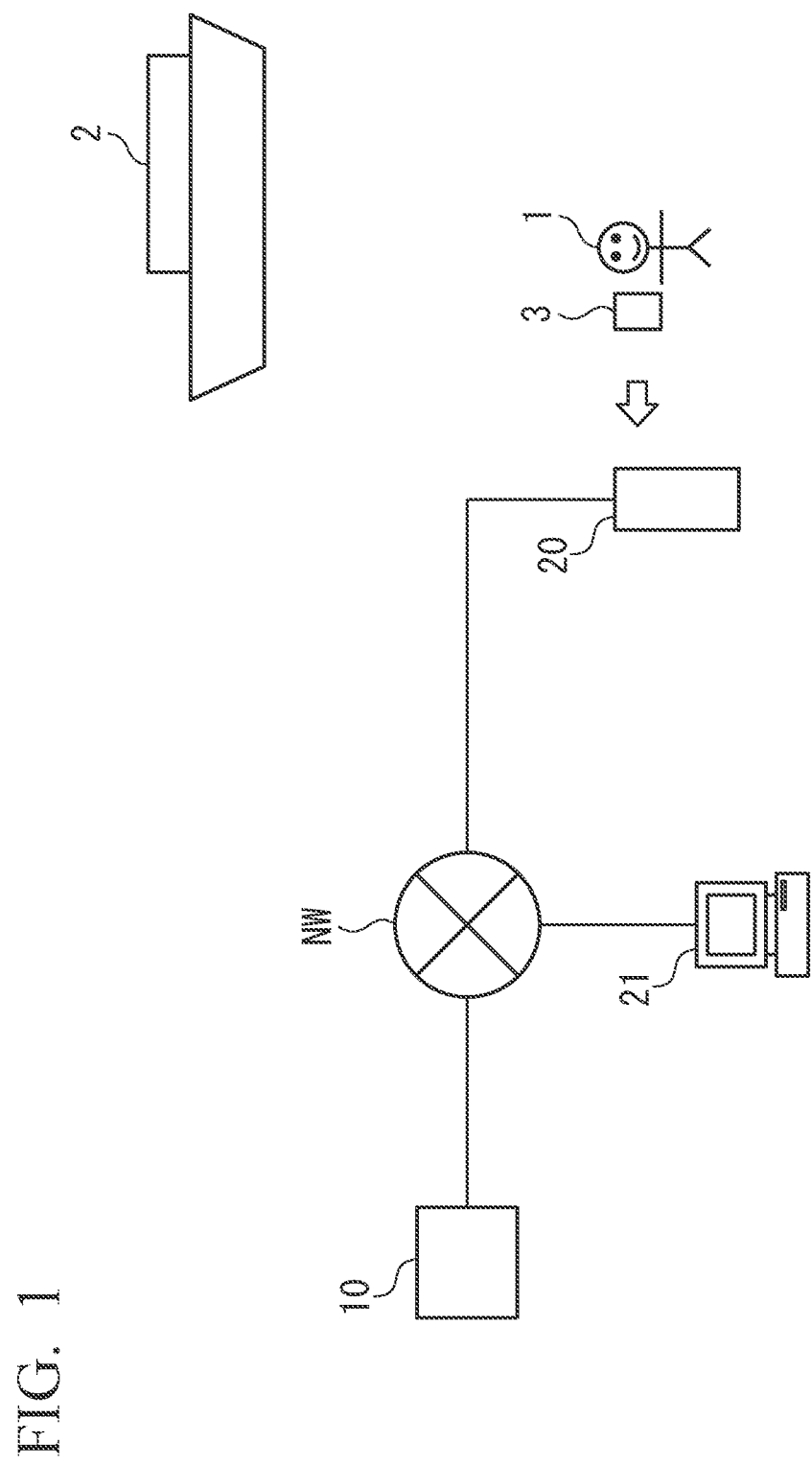
FIG. 1 is a diagram showing an example of a point calculation system in a first embodiment according to the present invention.

FIG. 1 is a diagram showing an example of a point calculation system according to the first embodiment of the present invention.

The point calculation system of the present embodiment is a system that calculates points according to a distance actually traveled by a passenger boat on which a user has embarked for the user (passenger) using the passenger boat and grants the calculated points to the user. When the points are accumulated, the user obtains a right in which the user can embark on a boat for free, embark on a boat at a discounted price, use a high-grade passenger room, exchange the points with other point systems at a fixed conversion rate, or use benefits of other systems.

A user 1 is a passenger using a boat 2. The boat 2 is, for example, a ferry. The boat 2 is equipped with a differential global positioning system (DGPS) receiver that measures position information of the boat 2, or an electromagnetic log or a Doppler log for measuring a speed of the boat 2 through water. Also, the boat 2 is equipped with a communication device and transmits detection information from the DEWS receiver or the electromagnetic log to a point calculation device 10 that will be described below at predetermined time intervals.

The user 1 possesses a card 3 for receiving a use point service of the boat 2. The card 3 is, for example, an IC card or a magnetic card. On an IC chip or a magnetic tape of the card 3, identification information (a point ID) of the card 3 or reservation information of a service to be used is recorded. The reservation information includes information such as an embarkation port, a disembarkation port, and a grade of a passenger room to be used. The point ID is associated with the user 1 and recorded on a storage unit provided in the point calculation device 10.

A transmission device 20 transmits information such as a point ID. The transmission device 20 is configured to include a reader and a computer. The reader reads the point ID from the card 3 and the computer acquires the point ID read by the reader, adds information such as a reading time or a port at which the point ID is read to the point ID, and transmits the information to the point calculation device 10. The information added to the point ID can be changed by an employee operating the computer. The transmission device 20 is installed, for example, at a port side entrance through which the user 1 passes when embarking on/disembarking from the boat 2 or near an entrance of the boat 2.

At a time of embarking on and disembarking from the boat 2, the user 1 causes the transmission device 20 to read the information recorded on the card 3 by holding the card 3 over the transmission device 20. The transmission device 20 transmits the point ID read from the card 3 and a reading time thereof to the point calculation device 10 via a network. Here, particularly at the time of disembarkation, a fixed value such as a scheduled arrival time may be used instead of the reading time.

A terminal device 21 is a device including a computer. Each port or another management place (a data center or the like) is equipped with the terminal device 21, and an employee of the port inputs departure and arrival times of the boat 2 to the terminal device 21. The terminal device 21 transmits the input departure and arrival times to the point calculation device 10 via the network.

Also, the card 3 does not necessarily have to be possessed by the user 1. For example, the boat 2 is provided with a passenger room and the user 1 normally receives a passenger room key and embarks on the boat. Therefore, when the user 1 embarks on or disembarks from the boat using a card key in which the passenger room key and the card 3 are integrated, the transmission device 20 may read information such as the point ID recorded on the card key. In this case, a writing device is connected to the terminal device 21 so that, the card key may be given to the user 1 after the point ID or boat reservation information is written to the card key when the employee gives the card key to the user 1. The point ID or the reservation information of the user 1 is pre-stored in the storage unit of the point calculation device 10 in association with information such as a name or an address of the user 1, and the terminal device 21 acquires the point ID of the user 1 from the storage unit of the point calculation device 10 according to the information such as the name of the user 1 and records the acquired point ID in the card key.

Also, the point ID may be recorded on a portable terminal device such as a smartphone possessed by the user 1 instead of the card 3, and the point ID may be read by the transmission device 20 when the user 1 holds the portable terminal device over it.

Also, the card 3 or the transmission device 20 is not necessarily indispensable in the point calculation system. For example, a crew member of the boat 2 handwrites an embarkation time and a disembarkation time on a paper embarkation ticket to be issued to each user 1 and an employee who is in a port where the user has disembarked from the boat inputs the embarkation time and the disembarkation time to the terminal device 21. The terminal device 21 may acquire the point ID from the storage unit of the point calculation device 10 according to an instruction operation of the employee and transmit information such as the point ID, the embarkation time, and the disembarkation time to the point calculation device 10. In the following description, a case in which the user 1 possesses the card 3 will be described as an example.

The point calculation device 10 grants points based on an actual movement distance of the boat 2 calculated using position information or speed information of the boat 2 transmitted from the boat 2 to the user 1. Granting points to the user 1 indicates recording calculated points in association with the point ID of the user 1. The point calculation device 10 may be installed in a data center or the like or may be mounted on the boat 2.

Also, a point granting history calculated by the point calculation device 10, the currently accumulated number of points, or the like can be browsed through a web page or the like dedicated to the user via the Internet. The user 1 can browse only information about the point ID associated with him/her on the web page.

Figure 2:
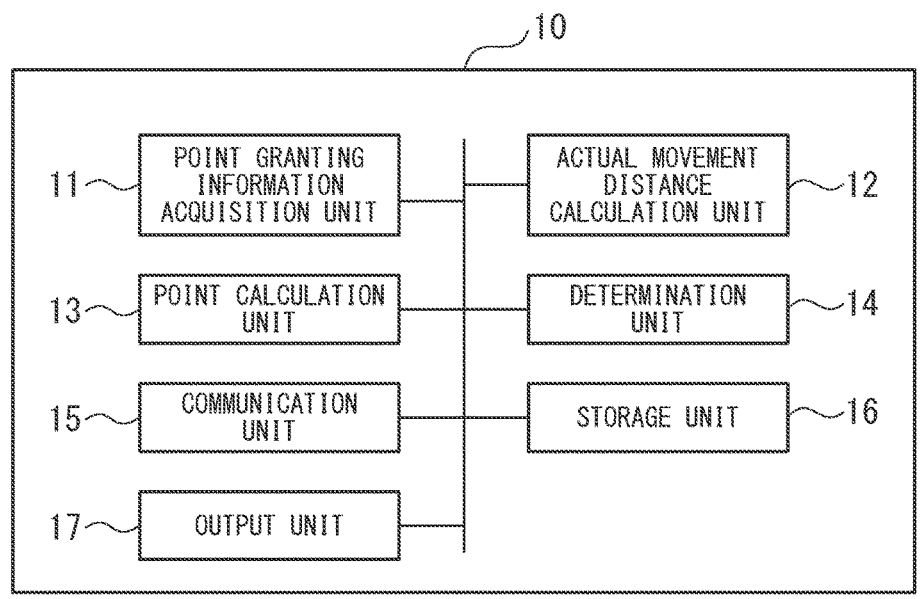
FIG. 2 is a block diagram showing an example of a point calculation device in the first embodiment according to the present invention.

FIG. 2 is a block diagram showing an example of a point calculation device according to the first embodiment of the present invention.

As shown in FIG. 2, the point calculation device 10 includes a point granting information acquisition unit 11, an actual movement distance calculation unit 12, a point calculation unit 13, a determination unit 14, a communication unit 15, a storage unit 16, and an output unit 17.

The point granting information acquisition unit 11 acquires position information or speed information of the boat 2 at predetermined intervals. Also, the point granting information acquisition unit 11 acquires information such as the point ID recorded on the card 3 transmitted from the transmission device 20.

The actual movement distance calculation unit 12 calculates an actual movement distance of the vehicle from departure to arrival. For example, the actual movement distance calculation unit 12 calculates a movement route or distance of the boat 2 according to a trajectory of a position indicated by the position information of the boat 2 acquired from the point granting information acquisition unit 11. Alternatively, the actual movement distance calculation unit 12 calculates the movement distance of the boat 2 by integrating the speed information of the boat 2 acquired from the point granting information acquisition unit 11.

The point calculation unit 13 calculates points according to a difference between a movement distance preset for movement from a departure location to an arrival location and the actual movement distance.

The determination unit 14 performs a process of determining the information acquired from the point granting information acquisition unit 11. The determination process is, for example, a process of determining whether or not a point 11) is stored in the storage unit of the point calculation device 10.

The communication unit 15 exchanges information with other devices.

The storage unit 16 stores various pieces of information such as the position information or speed information of the boat 2 acquired by the point granting information acquisition unit 11, a preset movement distance between ports, a table for calculating granted points, and the like.

The output unit 17 outputs the points calculated by the point calculation unit 13 to an inboard monitor or the like.

Figure 3:
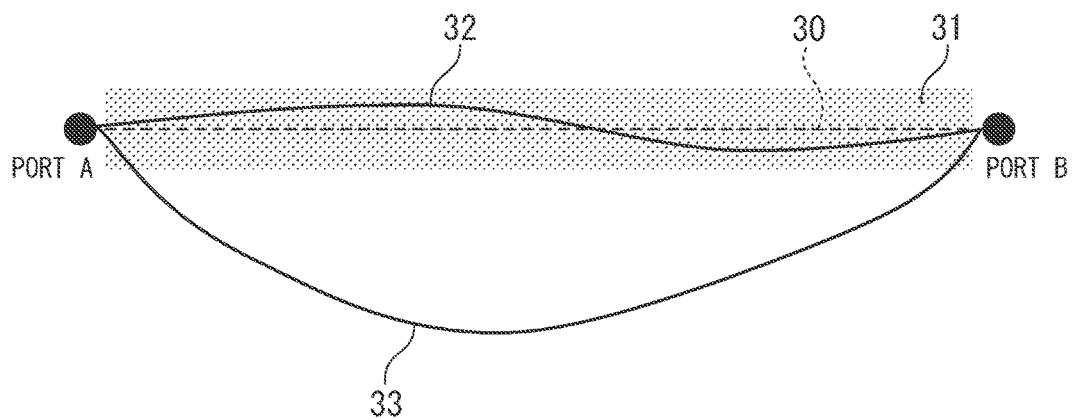
FIG. 3 is a diagram showing schematically a point calculation method in the first embodiment according to the present invention.

FIG. 3 is a diagram showing schematically a point calculation method in the first embodiment according to the present invention.

A route 30 indicates a movement route when the boat 2 moves from port A to port B. The route 30 is a preset movement route. A region 31 is a region having a predetermined width on both sides of the route 30 using the route 30 as a center line. A route 32 indicates an example of an actual movement route when the boat 2 moves from port A to port B. A route 33 indicates another example of the actual movement route when the boat 2 moves from port A to port B.

A movement distance on the route 30 is assumed to be $X_{30}$ (km). Also, a movement distance on the route 32 is assumed to be $X_{32}$ (km). Also, a movement distance on the route 33 is assumed to be $X_{33}$ (km).

In the present embodiment, the point calculation unit 13 calculates points according to a difference between a preset movement distance and the actual movement distance. That is, when the boat 2 moved on the route 32 from port A to port B, the point calculation unit 13 calculates points according to a distance calculated by $X_{32}-X_{30}$. Likewise, when the boat 2 moved on the route 33 from port. A to port B, points according to a distance calculated by $X_{33}-X_{30}$ are calculated.

Also, when an allowable range is provided in the movement route of the boat 2, and movement is performed within the region 31, movement on a preset route is considered, a total of movement distances outside the region 31 are summed, and points corresponding to the total distance may be calculated. Also, more easily, a predetermined movement route among a large number of movement routes from port A to port B without deviating from the region 31 is defined as a standard, and points may be calculated according to a difference between a movement distance on the standard route and an actual movement distance. The movement distance on the standard route are referred to as standard movement distance.

By calculating the points according to the actual movement distance in this manner, more points are granted to the user when a navigated distance is longer even when navigating a longer distance outside the preset route. Thereby, for example, a sense of uneasiness of the user in a case in which "a route is different from a normal route" when the boat 2 travels while making a detour and unpleasantness due to unstable traveling when the boat 2 meanders can be expected to be alleviated. Also, it is meaningful as a penalty due to failing to travel a prescribed course for a company that provides a shipping service of the boat and it is possible to obtain an effect of leading to maintaining consciousness that navigation should be carried out according to a preset route as much as possible or efficient and economical navigation.

FIG. 4 is a first diagram showing an example of a table used for point calculation in the first embodiment according to the present invention.

FIG. 4 shows an example of an embarkation/disembarkation record table of the user 1 stored in the storage unit 16. As shown in FIG. 4, an embarkation/disembarkation record table 101 stores items such as "point ID," "embarkation port," "embarkation time," "disembarkation port," "disembarkation time," "passenger room grade," and "operation ID." In the "point ID," the point ID of the user 1 is stored. In the "embarkation port," a port where the user 1 embarked on the boat is stored. In the "embarkation time," an embarkation time (a point granting start time) of the user 1 is stored. In the "disembarkation port," a port where the user 1 disembarked from the boat is stored. In the "disembarkation time," a disembarkation time of the user 1 is stored. In the "passenger room grade," a grade of a passenger room used by the user 1 is stored. For example, the passenger room grade includes "second grade," "special second grade," "first grade," and "special grade." In the "operation ID," an identification number of a boat used by the user 1 is stored.

FIG. 5 is a second diagram showing an example of a table used for point calculation in the first embodiment according to the present invention.

FIG. 5 is an example of a navigation record table of the boat 2 stored in the storage unit 16. As shown in FIG. 5, a navigation record table 102 stores items of "operation ID," "branch number," "vessel name," "departure port," "scheduled port departure time," "port departure time," "arrival port," "scheduled port arrival time," "port arrival time," "standard movement distance," and "actual movement distance." In the "operation ID," an identification number of a boat is stored. In the "branch number," when a plurality of sections are included in a navigation route of a certain boat 2, numbers allocated to the sections are stored. For example, when a boat with operation ID=001 navigates from port A to port D and stops at ports B and C in the middle, branch number=01 is allocated to a section from port A to port B, branch number=02 is allocated to a section from port B to port C, and branch number=03 is allocated to a section from port C to port D. In the "vessel name," a type or name of the boat is stored. A name of a port from which the boat departs in each section is stored in the "departure port." and a name of a port at which the boat arrives in each section is stored in the "arrival port." A port departure time written on a timetable is stored in the "scheduled port departure time," and a port arrival time written on the timetable is stored in the "scheduled port arrival port time." An actual port departure time is stored in the "port departure time" and an actual port arrival time is stored in the "port arrival time." In the "standard movement distance," a standard movement distance from departure to arrival is stored. In the "actual movement distance," an actual movement distance of the boat 2 is stored.

FIG. 6 is a third diagram showing an example of a table used in point calculation in the first embodiment according to the present invention.

FIG. 6 is an example of a point conversion table defining a method of calculating points calculated in the storage unit 16. As shown in FIG. 6, a point conversion table 103 has items of "condition" and "granted points." In the "condition," a situation in which points are granted is stored. In the "granted points," the number of points to be granted when the "condition" is satisfied is stored. Data in a first row of the point conversion table 103 defines that 100 points will be granted at a time of embarkation from port A to port B. Likewise, data of a second and third row respectively defines that 120 points are granted in the case of embarkation from port B to port C and 80 points are granted in the case of embarkation from port C to port D. Points to be granted for the embarkation in each section (such as port A to port B) may be a value corresponding to a standard movement distance of the section or a value according to a movement time period. Alternatively, the same points may be set to be always granted regardless of an embarkation section. Hereinafter, granted points predetermined for each embarkation section are referred to as basic points. Also, for example, data of a fourth row defines that 10 points are granted per km of movement distance. Point granting based on provision of the point conversion table 103 will be described below with an example.

Figures 7, 8:
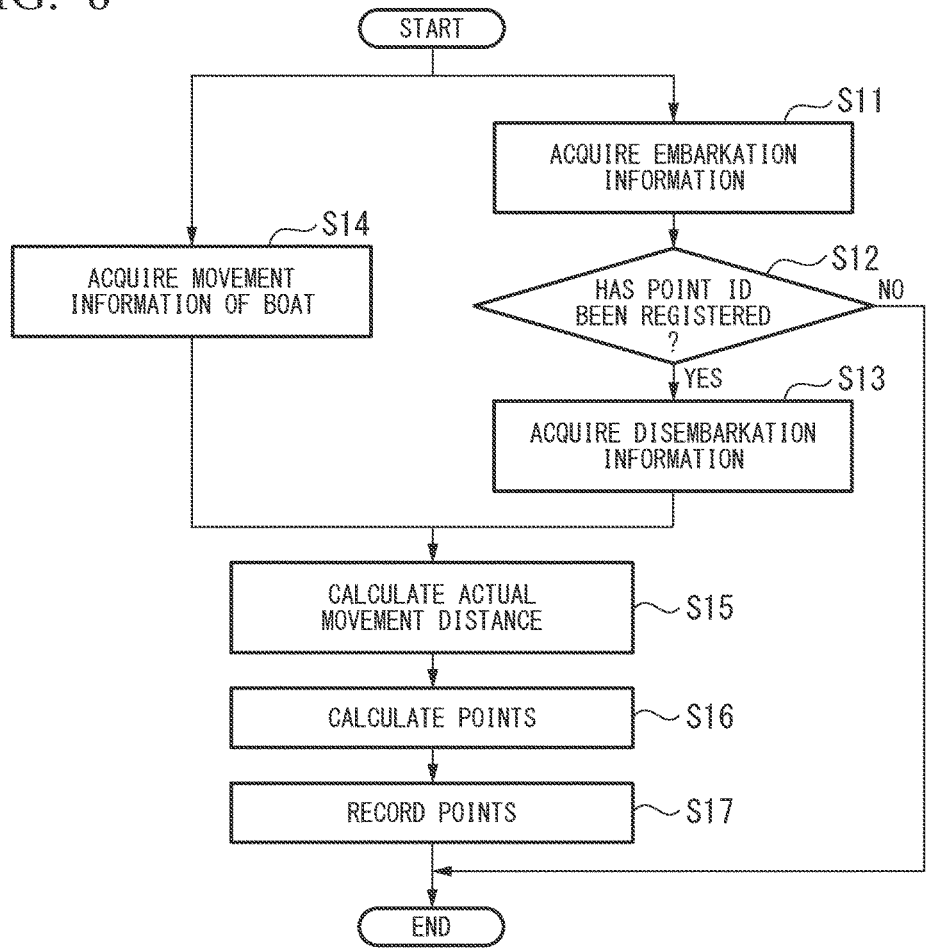
FIG. 7 is a fourth diagram showing an example of a table used in point calculation in the first embodiment according to the present invention.
FIG. 8 is an example of a flowchart of a point calculation method in the first embodiment according to the present invention.

FIG. 7 is a fourth diagram showing an example of a table used for point calculation in the first embodiment according to the present invention.

FIG. 7 is an example of a point management table for storing points accumulated by the user 1 for each user 1 stored in the storage unit 16. As shown in FIG. 7, a point management table 104 has items of "point ID," "name," "contact information," "accumulated number of points," "validity period," and "card grade." In the "point ID," the point ID of the user 1 is stored. A name of the user 1 is stored in the "name," and an address or a telephone number, an address, a date of birth, or the like of the user 1 are stored in the "contact information." Points accumulated by the user 1 are stored in the "accumulated number of points," and a validity period of the points is stored in the "validity period." In the "card grade," a grade of the card 3 possessed by the user 1 is stored.

The point calculation unit 13 calculates points for each point ID according to the provision of point granting stored in the point conversion table 103 shown in FIG. 6 and adds the calculated points to the accumulated points of the point ID stored in the point management table 104. The user 1 can obtain a right to use a higher-grade passenger room or embark on a boat for free in exchange for accumulated points.

Also, the user 1 registers his or her personal information when the user 1 uses the boat 2 for the first time. At this time, a management system (not shown) for managing reservation information and the like allocates a point ID to the user 1 according to a predetermined method and creates data of the user 1 in the point management table 104.

FIG. 8 is an example of a flowchart of a point calculation method in the first embodiment according to the present invention.

The point calculation method when the certain user 1 uses the boat 2 will be described with reference to FIG. 8.

First, when the user 1 embarks on the boat 2, he/she holds the card 3 over a reader of a transmission device 20A provided at an embarkation port. Then, the transmission device 20A acquires information such as a point ID from the card 3 and transmits the point ID, a reading time (an embarkation time), an embarkation port, an operation ID, a grade of a passenger room purchased by the user 1, and the like to the point calculation device 10. Also, the information of the embarkation port and the operation ID are pre-recorded on the transmission device 20A.

In the point calculation device 10, the point granting information acquisition unit 11 acquires embarkation information of the user 1 (step S11). Specifically, the point granting information acquisition unit 11 acquires the point ID of the user 1, the operation ID, the embarkation time, and the embarkation information such as the boarding port, and outputs them to the determination unit 14.

Also, the point granting information acquisition unit 11 acquires an operation ID, a branch number, a vessel type, a departure port, a scheduled port departure time, and a port departure time of the boat 2 transmitted from a terminal device 21A of the embarkation port. The operation ID, the branch number, the vessel type, the departure port, the scheduled port departure time, and the port departure time are values input to the terminal device 21A by an employee of the embarkation port. The point granting information acquisition unit 11 records the acquired operation ID, branch number, vessel type, departure port, scheduled port departure time, and port departure time on the navigation record table 102 shown in FIG. 5.

Next, the determination unit 14 determines whether or not the data of the acquired point ID is registered in the point management table 104 shown in FIG. 7 (step S12). When the point ID is not registered in the point management table 104 (step S12; No), an error message is displayed on a display device connected to the transmission device 20A and the present processing flow ends. When the point ID is registered in the point management table 104 (step S12; Yes), the point granting information acquisition unit 11 stores and writes the acquired point ID, operation ID, embarkation time, embarkation port, and passenger room grade in the embarkation/disembarkation record table 101 of the storage unit 16 shown in FIG. 4. Also, in the determination of step S12, reservation information of the user may be compared with the acquired operation ID or embarkation port and a determination of whether or not the user 1 has embarked on the boat in accordance with the reservation information may be made.

At a subsequent embarkation port, the user 1 holds the card 3 over a reader of a transmission device 20B provided at a disembarkation port. Then, the transmission device 20B acquires the point ID from the card 3 and transmits the point ID, the operation ID, the reading time (a disembarkation time), and the disembarkation port to the point calculation device 10. The information of the disembarkation port and the operation ID are pre-recorded on the transmission device 20B. In the point calculation device 10, the point granting information acquisition unit 11 acquires disembarkation information such as the point ID (step S13). The point granting information acquisition unit 11 retrieves the embarkation/disembarkation record table 101 using the acquired point ID and operation ID, specifies a record indicating the embarkation/disembarkation record of the disembarkation user 1, and updates the items of "departure port" and "disembarkation time" of the record with the acquired information.

Also, the point granting information acquisition unit 11 acquires the operation ID, the branch number, the vessel type, an arrival port, a scheduled port arrival time, and a port arrival time of the boat 2 transmitted from a terminal device 21B of the disembarkation port. The operation ID, the branch number, the vessel type, the arrival port, the scheduled port arrival time, and the port arrival time are values input to the terminal device 21B by an employee of the arrival port. The point granting information acquisition unit 11 retrieves the navigation record table 102 using the acquired operation ID and branch number, specifies a record indicating the navigation record of the boat on which the user 1 embarked, and writes and stores the acquired information of the arrival port, the scheduled port arrival time, and the port arrival time in the items of "arrival port," "scheduled port arrival time," and "port arrival time."

At the same time as steps S11 to S13, the point granting information acquisition unit 11 acquires movement information from the boat 2 (step S14). Specifically, the point granting information acquisition unit 11 acquires at least one of position information and speed information of the boat 2 and information of times at which they are measured at predetermined intervals, associates the acquired information with the operation ID, and mites the information associated with the operation ID to the storage unit 16. Information obtained by combining the position information or the speed information with the measurement time is referred to as movement information. Next, the point granting information acquisition unit 11 outputs information of the point ID, the operation ID, the port departure time, and the port arrival time to the actual movement distance calculation unit 12 and issues an instruction for calculating an actual movement distance.

Next, the actual movement distance calculation unit 12 calculates an actual movement distance in a section in which the user 1 embarked on the boat (step S15). Specifically, if the point granting information acquisition unit 11 records the disembarkation information of the user 1 on the embarkation/disembarkation record table 101 and records the port arrival time and the like on the navigation record table 102, the point granting information acquisition unit 11 outputs information of the point ID, the operation ID, the departure port, the port departure time, the arrival port, and the port arrival time to the actual movement distance calculation unit 12 and issues an instruction for calculating the actual movement distance.

The actual movement distance calculation unit 12 reads information measured from the port departure time to the port arrival time with the same operation ID from the movement information of the boat recorded in the storage unit 16. The actual movement distance calculation unit 12 calculates the actual movement distance from the departure port to the arrival port using the read movement information. For example, when speed information has been acquired from boat 2, values obtained by multiplying each acquired speed by a measurement interval time are summed to calculate the actual movement distance. Also, when position information has been acquired, straight-line distances between two points, which are indicated by two pieces of position information continuously measured in time series, using, for example, two-dimensional coordinate information (latitude/longitude) of a plane direction in the position information are summed to calculate the actual movement distance. Also, when the position information has been acquired, only a part outside the region 31 shown in FIG. 3 among lines sequentially connecting the two points indicated by the two pieces of position information continuously measured in time series is extracted and the total length of the part is calculated (hereinafter, the length is a non-standard movement distance).

Next, the actual movement distance calculation unit 12 retrieves a record in which information of the operation ID, the departure port, the port departure time, the arrival port, and the port arrival time acquired from the point granting information acquisition unit 11 match values of the items of "operation ID," "departure port," "port departure time," "arrival port," and "port arrival time" from the navigation record table 102 and respectively writes and records a standard movement distance and a calculated actual movement distance in the items of "standard movement distance" and "actual movement distance" of the record. Also, when the actual movement distance calculation unit 12 has calculated the non-standard movement distance, the non-standard movement distance is written in the "actual movement distance" item of the navigation record table 102. Also, a standard movement distance is preset for each section from the departure port to the arrival port and stored in the storage unit 16, and the actual movement distance calculation unit 12 reads and acquires the standard movement distance from the storage unit 16 according to the acquired information of the departure port and the arrival port.

Next, the actual movement distance calculation unit 12 outputs the information of the point ID, the operation ID, the departure port, the port departure time, the arrival port, the port arrival time, the actual movement distance, and the standard movement distance to the point calculation unit 13 and issues an instruction for calculating points for a current embarkation of the user 1.

The point calculation unit 13 performs point calculation (step S16). The present embodiment is characterized in that points are calculated in accordance with the actual movement distance of the boat 2 relating to the embarkation of the user 1. Hereinafter, various point calculation methods of the present embodiment will be described.

[Point Calculation Based on Total Actual Movement Distance]

In the point calculation based on a total actual movement distance, the point calculation unit 13 calculates points according to a total actual movement distance in an embarkation section of the user 1. The point calculation unit 13 calculates points to be granted to the user 1 by multiplying an actual movement distance acquired from the actual movement distance calculation unit 12 by the number of points granted per unit movement distance. Points to be granted for an embarkation per unit movement distance are read from a record of the point conversion table 103 that has the "condition" of "movement distance" by the point calculation unit 13. In the example of FIG. 6, 10 points are granted per km.

Because it is possible to obtain points according to a navigated distance even when the navigation is time-consuming due to a detour if points are calculated in this manner, dissatisfaction of the user can be alleviated.

[Point Calculation Based on Movement Distance Exceeding Standard Movement Distance]

In the point calculation based on a movement distance exceeding a standard movement distance, the point calculation unit 13 calculates points (first use points) according to a difference between an actual movement distance and a standard movement distance in a section in which the user 1 embarked on a boat. The point calculation unit 13 subtracts the standard movement distance from the actual movement distance using an acquired actual movement distance and standard movement distance. Then, points to be granted to the user 1 are calculated by multiplying a value obtained through the subtraction by the number of granted points per unit movement distance. The points per unit movement distance are the same as in "point calculation based on total actual movement distance."

Also, the point calculation unit 13 obtains basic points corresponding to the section in which the user 1 has embarked on the boat according to information of a departure port and an arrival port acquired from the actual movement distance calculation unit 12.

The point calculation unit 13 adds points based on the movement distance exceeding the standard movement distance to the basic points to determine the points to be granted to the user 1.

[Point Calculation Based on Movement Distance Other than Standard Route]

In the point calculation based on a movement distance other than a standard route, the point calculation unit 13 calculates points (first use points) according to a movement distance outside a standard route in a section in which the user 1 has embarked on the boat. Unlike the two above-described methods, this calculation method is a method used when a non-standard movement distance is written in the "actual movement distance" item in step S15.

The point calculation unit 13 calculates points to be granted to the user 1 by multiplying the acquired actual movement distance (the non-standard movement distance) by the number of granted points per unit movement distance. The points per unit movement distance are the same as in "point calculation based on total actual movement distance."

Also, the point calculation unit 13 reads basic points according to the standard movement distance of the section from the point conversion table 103 according to information of a departure port and an arrival port acquired from the actual movement distance calculation unit 12. For example, if the boat 2 on which the user 1 embarked from port A to port D is intended to navigate from port A to port D through a route from port A to port B, a route from port B to port C, and a route from port C to port D, the point calculation unit 13 refers to the point conversion table 103 and reads the granted points from a record having the "condition" of "departure port to arrival port." For example, in the above example, 100 points granted for a section from "port A to port B", 120 points granted for a section from "port B to port C", and 80 points granted for a section from "port C to port D" are read and summed and the basic points are calculated according to the section (from port A to port D) in which the user 1 has embarked on the boat.

The point calculation unit 13 adds points according to the movement distance outside the standard route to the basic points and determines the points to be granted to the user 1.

Also, the basic points are set according to the standard movement distance between ports.

Also, in the above-described "point calculation based on movement distance other than reference route" or "point calculation based on movement distance exceeding standard movement distance," a value larger than a value obtained by dividing the number of basic points in a certain section by the standard movement distance may be set as the number of points per unit movement distance. Thereby, it is possible to raise a sense of crisis with regard to deviating from the standard route of a shipping company.

"Point Calculation Based on Movement Distance within Predetermined Period"

In the point calculation based on a movement distance within a predetermined period, the point calculation unit 13 calculates points according to how long the user 1 has moved after embarkation, for example, within one month. This point calculation method is used for the purpose of additionally granting points to the user 1 with a high use frequency.

In this method, any of the above-described methods may be used to obtain the movement distance for which points are granted. For example, an actual movement distance, a movement distance exceeding a standard movement distance, or a distance obtained by adding the standard movement distance to a movement distance outside a standard route may be used.

First, for each point ID, the point calculation unit 13 reads embarkation/disembarkation record data in a predetermined period from the embarkation/disembarkation record table 101. The point calculation unit 13 then reads an actual movement distance at a time of each use of the user 1 from the navigation record table 102 according to information of an operation ID, an embarkation port, an embarkation time, a disembarkation port, and a disembarkation time in the embarkation/disembarkation record data. The point calculation unit 13 sums the read actual movement distances. Next, the point calculation unit 13 refers to the point conversion table 103 and reads the number of granted points from a record having the "condition" of "T km or more" according to a total value ($\leq$T) of the movement distances. The point calculation unit 13 determines the read value as the number of granted points.

In the point conversion table 103, for example, if a round trip is made three times or more a week in a certain section, a reachable movement distance in one month is set. Then, a passenger using a regular boat service of the section on a daily basis is encouraged to continuously use the boat 2 because points are added according to the use.

Also, a passenger who uses a regular boat service on a daily basis uses only a second-grade room (the lowest-grade passenger room) in many cases. According to this point calculation method, users with high use frequencies can be expected to be induced to use high-grade passenger rooms by allowing such users to have opportunities to experience the higher grade passenger rooms using points.

The following is not a matter concerning the actual movement distance during the embarkation of the user 1, but a satisfaction of the user can be increased in combination with the point granting according to the above-described actual movement distance.

"Point Calculation Based on Level of Crowdedness"

In the point calculation based on a level of crowdedness, the point calculation unit 13 further sums points (second use points) according to a level of crowdedness of the boat 2 in addition to an actual movement distance thereof. For example, at each port, an employee counts the number of passengers who embark on and disembark from the boat and transmits the counted number from the terminal device 21 to a management system via a network. In the management system, the number of passengers is recorded for each boat and section. The point calculation unit 13 acquires the number of passengers in the section in which the user 1 serving as a target of point calculation has embarked on the boat from the management system and calculates, for example, a percentage of the maximum number of passengers. When the number of passengers reaches 90% of the maximum number of passengers on the boat 2, granted points are acquired from a record having the "condition" of "embarkation ratio of 90% or more" from the point conversion table 103, and points are granted to the user 1 embarking on the boat in the section in addition to the points according to the actual movement distance.

Thereby, it is possible to alleviate discomfort and the like due to crowdedness of the boat 2 or dissatisfaction due to impossibility of use because of full occupancy in spite of wanting to use a high-grade passenger room.

Alternatively, the use of the user nay be encouraged by assigning points to a section with a low level of crowdedness.

"Point Calculation Based on Passenger Room Grade"

In the point calculation based on passenger room grade, the point calculation unit 13 further adds points based on a grade of a passenger room used by the user 1 (second use points) to points according to an actual movement distance.

The point calculation unit 13 reads information of the passenger room grade used by the user 1 according to a point ID from the embarkation/disembarkation record table 101. The point calculation unit 13 acquires points to be granted for the read passenger room grade from the point conversion table 103. For example, if the grade of the passenger room used by the user 1 is "first grade," 10 points are acquired from data having the condition of "first grade" in the example of FIG. 6. Then, the point calculation unit 13 adds 10 points to the points based on the actual movement distance to calculate points to be granted to the user.

For example, when grades are divided into "second grade," "first grade," and "special grade" in ascending order of grade, it is possible to grant points to a user of a room of a first grade or higher without granting points to a user of a second-grade room when points to be granted are set for "first grade," and "special grade" in the point conversion table 103. By performing the above-described setting, it is possible to favorably treat users who use rooms of the first grade or higher and induce the users to use rooms with a high grade.

Also, for example, even when a user who normally uses an inexpensive second-grade room wishes to use the first-grade room in a situation where the boat is crowded, it becomes easy to use the first-grade room if points are added thereto.

Also, the number of points to be granted may differ according to a type of vessel on which the user embarks in addition to being differentiated based on passenger room grade.

"Point Calculation Based on Number of Users"

In the point calculation based on the number of users, the point calculation unit 13 further adds points based on the number of users (second use points) to points based on an actual movement distance for a passenger embarking on a boat as part of a family or a passenger embarking on the boat as part of a group.

Information of the number of users is included in reservation information input from the user at a time of reservation and stored in a management system. Upon calculation of points, the point calculation unit 13 acquires information of the number of users with reference to this reservation information. Then, the point calculation unit 13 acquires points corresponding to the number of users with reference to the point conversion table 103 and adds the acquired points to the points based on the actual movement distance. In the example of FIG. 6, in the case of use by four or more users, five points are added to a point ID of each of the four or more passengers who embark on the boat. Thereby, it is possible to encourage embarkation with more friends and the like to promote the use of the boat.

"Point Calculation at Time of Navigation Cancellation, Port Skip, or Return"

In the point calculation at a time of navigation cancellation, the point calculation unit 13 calculates points to be granted to a user who has come to a port as if he/she is actually going to embark on a boat when it is no longer possible to operate the boat 2 due to a sudden weather change.

In such a case, information indicating the navigation cancellation together with a point ID or the like is set to be transmitted to the computer constituting the transmission device 20A. In this state, when the user 1 holds the card 3 over the transmission device 20A, the transmission device 20A transmits the point ID, an operation ID and information indicating the navigation cancellation to the point calculation device 10. In the point calculation device 10, the point granting information acquisition unit 11 acquires the information and outputs the information to the point calculation unit 13. The point calculation unit 13 reads granted points from data of the point conversion table 103 that has the "condition" of navigation cancellation and determines a value thereof as points to be granted to the user 1. Also, if a port skip or return has been made during navigation, the transmission device 20B transmits information indicating that the port skip or return has been made to the point calculation device 10 together with the point ID or the like as in the case of the navigation cancellation. The point calculation unit 13 reads granted points from the data of the point conversion table 103 that has the "condition" of "port skip" or "return" and determines a value thereof as the points to be granted to the user 1 (second use points). Also, the port skip is a case in which, although the boat normally stops at the port, the port is passed without going to that port due to bad weather or the like. In this case, for the user 1 scheduled to disembark from the boat at a skipped port, points granted due to the port skip are added to the points based on the actual movement distance. Also, points are granted due to the navigation cancellation for the user 1 scheduled to embark on the boat at the skipped port. Also, the return is a case in which the boat 2 returns to a previous port due to bad weather or the like before the boat 2 normally reaches the port. Even in this case, points granted due to the return are added to the points based on the actual movement distance for the user 1 who could not arrive at the destination port due to the return. Also, points are granted due to the navigation cancellation for the user 1 scheduled to embark on the boat from a port that could not be reached.

Thereby, dissatisfaction of the user stuck by the navigation cancellation or the like can be alleviated.

"Point Calculation Based on Number of Embarkations"

In the point calculation based on the number of embarkations, the point calculation unit 13 calculates points (second use points) according to the number of embarkations.

The point calculation unit 13 acquires points to be granted according to the number of embarkations from the point conversion table 103. For example, in the example of FIG. 6, one point is acquired from data in which the condition is "number of embarkations." This point is granted for one embarkation. The point calculation unit 13 adds the read one point to points based on an actual movement distance and calculates points to be granted to the user.

Although FIG. 6 shows an example in which one point is granted for one embarkation, predetermined points (e.g., 10 points) may be granted every 10 embarkations. Also, when the accumulated number of embarkations reaches 100, points to be granted may be changed step by step according to the accumulated number of embarkations such as a case in which 15 points are granted every 10 embarkations thereafter or the like.

"Point Calculation Based on Card Grade"

In the point calculation based on a passenger room grade, the point calculation unit 13 sums points based on a grade of the card 3 used by the user 1 (second use points). Various grades of cards with differing services that can be enjoyed according to an annual fee or the like are prepared for the card 3, and the user 1 can obtain points according to the grade of the card 3 that he/she uses The point calculation unit 13 reads grade information of the card 3 used by the user 1 according to the point ID from the point management table 104. The point calculation unit 13 acquires points to be granted for the read card grade from the point conversion table 103. For example, if the grade of the card 3 used by the user 1 is "$1^{st}$," five points are acquired from data for which the condition is "card grade ($1^{st}$)" in the example of FIG. 6. Then, the point calculation unit 13 adds 5 points to points based on an actual movement distance to calculate points to be granted to the user.

[Point Calculation in Consideration of Arrival Delay]

In the point calculation in consideration of an arrival delay, the point calculation unit 13 calculates points (second use points) according to how much an actual arrival time at a port is delayed from a scheduled port arrival time written in a timetable.

The point calculation unit 13 acquires navigation data of a section in which the user 1 has embarked on a boat from the navigation record table 102 using a point ID and an operation ID, and reads the scheduled port arrival time and a port arrival time. The point calculation unit 13 calculates a time difference by subtracting the scheduled port arrival time from the read port arrival time. If a value obtained through the subtraction is a positive value, the user 1 arrives at a disembarkation port after a delay in service. In that case, the point calculation unit 13 calculates points to be granted by multiplying the calculated arrival delay time period by the number of points per unit time for the arrival delay. The number of points for the arrival delay per unit time is set in a record of the point conversion table 103 that has the "condition" of "arrival delay," and 10 points per minute are given in an example of FIG. 6. The point calculation unit 13 adds points in consideration of the arrival delay to points according to an actual movement distance.

Thereby, dissatisfaction of the user 1 due to the arrival delay can be reduced. Points due to the arrival delay may not be granted if the calculated arrival delay time is within a predetermined allowable range (e.g., 1 minute).

Also, in contrast, points to be granted to the user 1 may be reduced at a time of early arrival at a port.

[Point Calculation in Consideration of Departure Delay]

In the point calculation in consideration of a departure delay, the point calculation unit 13 calculates points (second use points) according to how much an actual port departure time is delayed from a scheduled port departure time written in a timetable.

The point calculation unit 13 acquires navigation data of a section in which the user 1 has embarked on a boat from the navigation record table 102 using a point ID and an operation ID, and reads the scheduled port departure time and a port departure time. The point calculation unit 13 subtracts the scheduled port departure time from the read port departure time. If a value obtained through the subtraction is a positive value, the user 1 departs from an embarkation port after a delay in service. In that case, the point calculation unit 13 calculates points to be granted by multiplying the calculated departure delay time period by the number of points per unit time for the departure delay. The number of points for the departure delay per unit time is set in a record of the point conversion table 103 that has the "condition" of "departure delay," and 5 points per minute are given in an example of FIG. 6. The point calculation unit 13 adds points in consideration of the departure delay to points according to an actual movement distance.

If departure of boat 2 is delayed, the user will be uneasy as to whether he/she can arrive on time. By converting the departure delay of the boat into points, dissatisfaction of the user can be reduced. Points due to the departure delay may not be granted if the calculated departure delay time is within a predetermined allowable range (e.g., 1 minute).

[Point Calculation in Consideration of Embarkation Time Period]

In the point calculation in which an embarkation time period of a user is taken into consideration in basic points, the point calculation unit 13 calculates points according to a time period Obtained by summing a time period until port departure after the user embarks on a boat and a time period until the user disembarks from the boat after port arrival (second use points).

Using a point ID and an operation ID, the point calculation unit 13 reads an embarkation time and a disembarkation time of the user 1 from the embarkation/disembarkation record table 101 and reads a departure time and an arrival time from the navigation record table 102. Next, the point calculation unit 13 subtracts the embarkation time from the read port departure time to calculate a time period until the user departs from a port after embarkation and subtracts the port arrival time from the read disembarkation time to calculate a time period until the user disembarks from the boat after port departure.

Next, the point calculation unit 13 refers to the point conversion table 103, reads granted point from a record having the "condition" of "embarkation time period" and multiplies a sum of a time period until port departure after the user embarks on the boat and a time period until the user disembarks from the boat after port arrival by the read number of granted points. Next, the point calculation unit 13 adds points according to the time period from the embarkation to the port departure to points corresponding to an actual movement distance.

When points are calculated in this manner, more points are granted to the user 1 who embarks on the boat as quickly as possible and disembarks from the boat as slowly as possible. Generally, passengers of a ferry boat no ally embark on the boat just before a departure time, and this may cause departure delays. Also, at a time of disembarking from the boat, there are many customers who intend to disembark from the boat as soon as possible, and this causes crowdedness. By introducing a point calculation method and a point granting method based on the embarkation time period, it is possible to solve these problems and expect an effect of promoting smooth embarkation and disembarkation. Moreover, dissatisfaction of users who cannot disembark from the boat easily due to crowdedness can be relieved. It is also conceivable that the read operation is not performed particularly with regard to the disembarkation time. In such a case, a disembarkation time period may be calculated using a fixed value such as a scheduled arrival time as the disembarkation time.

"Point Calculation Based on Ticketing Time Period and Embarkation Time Period"

In the point calculation based on a ticketing time period and an embarkation time period, the point calculation unit 13 further adds points (second use points) according to a time period from ticketing to embarkation or a time period from ticketing to departure. For example, when the transmission device 20A is installed near a ticket vending machine and the user 1 holds the card 3 over it during ticket issuance, information of a ticket issuance time is transmitted to the point calculation device 10. In the point calculation device 10, the point granting information acquisition unit 11 is configured to write the ticket issuance time to an item of "embarkation time" of the embarkation/disembarkation record table 101. Then, the point calculation unit 13 calculates points according to a difference between the "embarkation time" for which the ticket issuance time is recorded and a "disembarkation time," and adds the calculated points to points according to an actual movement distance. A fixed value such as a scheduled arrival time may be used as the disembarkation time.

Ticket issuing machines and ticket sale places are often crowded when a departure time approaches. According to this point calculation method, it is possible to expect relaxation of crowdedness of the ticket sale places when the number of passengers trying to receive a ticket as soon as possible increases. By introducing the point calculation method into a port or the like where crowdedness of the ticket sale places becomes problematic due to a small number of ticket issuing machines or the like, the point calculation method can be used to prevent a departure delay due to crowdedness.

When points are calculated by these methods, the point calculation unit 13 records the points in the point management table 104 shown in FIG. 7 (step S17). Specifically, the point calculation unit 13 specifies a record of the point ID corresponding to the calculated points and reads the accumulated number of points. The point calculation unit 13 adds the points calculated in step S16 to the read accumulated number of points and updates a value of "accumulated number of points" of the record in the point management table 104.

According to the present embodiment, because a user can obtain points suitable for a sense of a movement distance during embarkation by granting points according to an actual movement distance after the user embarks on a boat, the user is incentivized to use the boat and therefore it is possible to promote the use of the boat.

Also, for a shipping company, navigation outside a route is a management issue because more fuel is used or a problem is likely to occur in terms of safety and stable operation. By introducing the point calculation system according to the present embodiment to "visualize" navigation outside the route and solve the problem, the shipping company can efficiently and rationally operate a boat and help to implement safety and safe operation.

Also, according to the point calculation system of the present embodiment, it is possible to obtain information such as contact information of the user 1, an embarkation/disembarkation port, and a frequency of use of a boat. Information provision can be performed for each user 1 using this information. The information to be provided is, for example, information such as bargain sale and events in a commercial facility near the embarkation port or the disembarkation port of the user 1, an operation state of transportation available from the disembarkation port, transfer information, or the like. By providing these pieces of information, the user 1 can more conveniently utilize the boat. The point calculation system will also contribute to regional promotion by collaborating with the commercial facility near the port so that an increase in the number of users of the boat can be expected.

When an actual movement distance is calculated from position information of the DGPS, the movement distance may also be calculated by adding position information in a height direction. Thereby, for example, because up and down movement (pitching, rolling, etc.) that occurs when a wave is large is added to the movement distance, the movement distance is converted into points (second use points), and the points are granted to users who feel uncomfortable due to a shaking of the boat body.

Also, with reference to the navigation record table 102, a value obtained by subtracting a predetermined value from the number of first use points granted to the user 1 may be determined as the number of first use points in consideration of punctuality even when an actual movement distance exceeds a standard movement distance if the boat 2 departs at a scheduled time and arrives at a scheduled port arrival time (that is, when a difference between the departure time of the boat 2 and the scheduled departure time is less than or equal to a predetermined threshold value and the difference between the arrival time of the boat 2 and the scheduled arrival time is less than or equal to the predetermined threshold value). Thereby, it is possible to distinguish the above case from a case in which an actual movement distance is long and an arrival is further delayed.

Also, if the actual movement distance is long despite keeping a navigation time period, it is conceivable that a speed of the boat is faster than usual. If the speed of the boat is fast, the user feels fear and it can lead to accident. Therefore, for example, when a speed transmitted from an electromagnetic log is compared with a predetermined threshold value, points (second use points) may be added according to a distance of navigation at a speed exceeding the threshold value if the speed exceeds the threshold value.

Also, the boat 2 is provided with an inboard monitor and is Connected to time point calculation device 10 via a network. On the inboard monitor, first use points and second use points output by the output unit 17 are distinguished and displayed in addition to a process of displaying a current traveling position of the boat 2, a scheduled arrival time, and the like.

Generally, the output unit 17 outputs, for example, "point calculation in consideration of arrival delay," "point calculation in consideration of departure delay," "point calculation based on level of crowdedness," "point calculation at the time of navigation cancellation, port skip, or return," or the like commonly related to the first use points and the second use points of a plurality of users at each embarkation section. Also, a reading device of the card 3 connected to the point calculation device 10 by wireless communication or the like is provided, for example, in the vicinity of the inboard monitor, and the output unit 17 acquires the point ID read from the card 3 of the certain user 1 from the reading device via the communication unit 15. In that case, the output unit 17 may further display the number of points unique to the user calculated by the point calculation unit 13 (e.g., "point calculation based on passenger room grade," "points based on number of users," or the like).

Second Embodiment

Hereinafter, a point calculation system according to the second embodiment of the present invention will be described with reference to FIG. 9.

Figure 9:
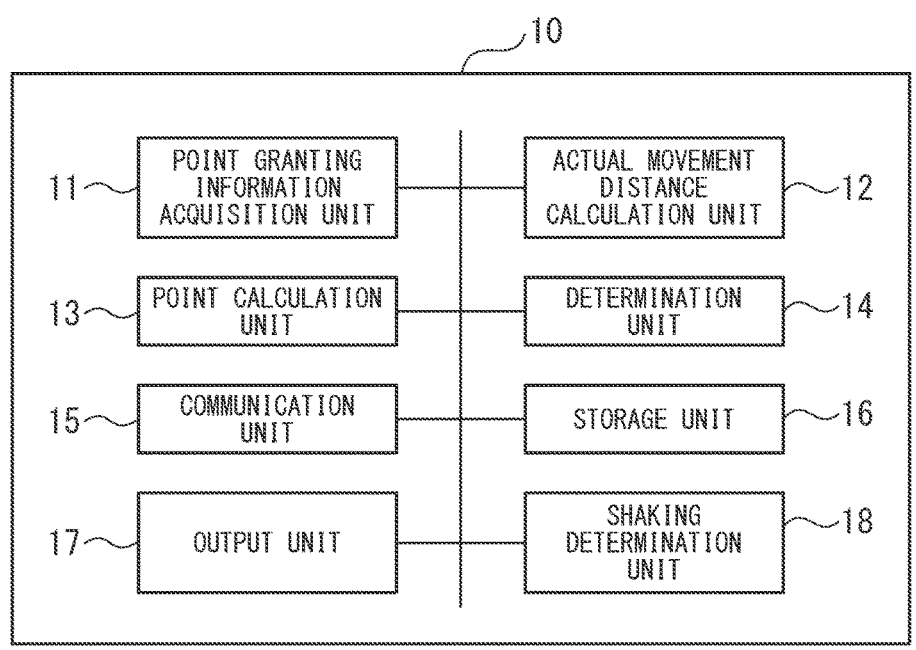
FIG. 9 is a diagram showing an example of a point calculation device in a second embodiment according to the present invention.

FIG. 9 is a diagram showing an example of a point calculation device according to the second embodiment of the present invention.

As shown in FIG. 9, the point calculation device of the present embodiment includes a shaking determination unit 18.

The shaking determination unit 18 acquires detection information of a vibration sensor mounted on the boat 2 from the boat 2 and determines a shaking of the boat 2. The vibration sensor is, for example, a gyro sensor, an acceleration sensor, an inclinometer, or the like. The other components of the point calculation device are the same as those in the first embodiment.

A point calculation method in the present embodiment will be described. First, a communication device provided in the boat 2 transmits detection information of a vibration sensor to the point calculation device 10. In the point calculation device 10, the communication unit 15 acquires the detection information and writes the detection information to the storage unit 16. Next, the shaking determination unit 18 reads detection information in an embarkation section of a user from the storage unit 16. The read detection information is, for example, information in which an acceleration and angular velocity of a body of the boat are chronologically recorded. The shaking determination unit 18 integrates the read acceleration to calculate a magnitude (amplitude) of a shaking. Alternatively, the shaking determination unit 18 integrates the read angular velocity to calculate an angle at which the body of the boat is shaken. The shaking determination unit 18 compares the calculated magnitude or angle of the shaking with a predetermined threshold value, and determines that a point granting target is in a shaken state if a shaking of a predetermined magnitude or angle or more continues for a predetermined period. The shaking determination unit 18 calculates a total time period during which it is determined that the boat 2 is in the shaken state in the embarkation section of the user. The shaking determination unit 18 outputs the calculated total time period to the point calculation unit 13. In the point conversion table 103, points for a shaking per unit time (e.g., 1 minute) are defined and the point calculation unit 13 reads this information and calculates points for a time period of the shaking of the boat 2 in the embarkation section of the user by multiplying the total time period acquired from the shaking determination unit 18 by the number of points.

Next, the point calculation unit 13 determines points to be finally granted by adding the calculated shaking-based points to points calculated based on the embarkation time period and the like described in the first embodiment. According to the present embodiment, because the points according to the shaking of the boat body are granted in addition to an actual movement distance of the user, the user's dissatisfaction due to the shaking of the boat body is expected to be alleviated.

Also, the shaking determination unit 18 may output a time at which the point granting target is determined to be in the shaken state to the actual movement distance calculation unit 12 the actual movement distance calculation unit 12 may calculate an actual movement distance at the time, and the point calculation unit 13 may calculate points according to a movement distance in a state in which the boat 2 is shaken.

Also, in the determination of the shaking of the boat, the determination may be made using weather data of an ocean. Specifically, the shaking determination unit 18 acquires weather data such as waves, tide levels, ocean currents, ocean winds and the like from the meteorological agency and calculates a time period during which the boat 2 is in the shaken state according to the information. For example, the storage unit 16 stores a correspondence table of a weather condition indicated by weather data and a time period (e.g., 20 minutes per hour) during which the boat is shaken per unit time calculated from weather data of a past time, an actual measurement value of the shaking at the past time, and the like, and the shaking determination unit 18 reads a shaking time period per unit time from this table using the weather data while the user 1 is embarked on the boat and multiplies the embarkation time period of the user 1 by the read shaking time period per unit time to calculate a time period during which the boat 2 is in the shaken state. The point calculation unit 13 calculates points based on the shaking by multiplying the number of points for the shaking per unit time stored in the point conversion table 103 by the time period during which the boat 2 is in the shaken state calculated by the shaking determination unit 18.

Also, a process of processing in the above-described point calculation device 10 is stored in a computer-readable recording medium in the form of a program, and the above-described processing is performed by the computer of the point calculation device 10 reading and executing the program. Here, the computer-readable recording medium may be a magnetic disk, a magneto-optical disc, a compact disc read-only memory (CD-ROM), a digital versatile disc-read only memory (DVD-ROM), a semiconductor memory, or the like. Also, the computer program may be distributed to a computer through a communication line, and the computer receiving the distributed program may execute the program.

Also, the above-described program may be a program for implementing some of the above-described functions. Further, the above-described program may be a program, i.e., a so-called differential file (differential program), capable of implementing the above-described function in combination with a program already recorded on the computer system.

Also, the point calculation device 10 may be configured to include one computer or may be configured to include a plurality of computers connected to be communicable.

Components in the above-described embodiments can be appropriately replaced with well-known components without departing from the spirit or scope of the present invention. Also, the technical scope of the present invention is not limited to the above-described embodiments, and various changes can be made thereto without departing from the spirit or scope of the present invention. For example, the point calculation method of the present invention can be applied to a system for calculating a shipping fee according to a shaking for a boat, an airplane, a vehicle and the like in which baggage is transported. The boat 2 is an example of a vehicle. Points are an example of use points. A port for which disembarkation is impossible due to a port skip or return is an example of a scheduled deboarding place.

INDUSTRIAL APPLICABILITY

According to the point calculation device, the boat, the point calculation method, and the program described above, it is possible to grant points according to a distance of a boat on which a user has actually embarked. Also, it is possible to provide advantageous information for each user based on a boarding record, contact information, and the like for each user.

REFERENCE SIGNS LIST

1 User
2 Boat
3 Card
10 Point calculation device
11 Point granting information acquisition unit
12 Actual movement distance calculation unit
13 Point calculation unit
14 Determination unit
15 Communication unit
16 Storage unit
17 Output unit
18 Shaking determination unit
20 Transmission device
21 Terminal device

What is claimed is:
1. A point calculation system comprising:
   a point calculation device comprising:
      an actual movement distance calculation unit configured to calculate an actual movement distance of a vehicle from departure to arrival;
      a point calculation unit configured to calculate first use points for the vehicle according to a difference between the actual movement distance and a preset movement distance from a departure location to an arrival location; and
an output unit configured to output the first use points calculated by the point calculation unit, and
a monitor configured to display the first use points output by the output unit,
a DGPS (differential global positioning system) receiver provided to the vehicle and configured to measure position information of the vehicle,
a first communication device provided to the vehicle and configured to transmit the position information of the vehicle measured by the DGPS receiver to the point calculation device at predetermined time intervals,
a second communication device provided at the departure location and configured to read information from an IC card or a magnetic card which is possessed by a user boarding on the vehicle and transmit a time which has been read as a time of the departure to the point calculation device,
a third communication device provided at the arrival location and configured to read information from the IC card or the magnetic card which is possessed by the user deboarding from the vehicle and transmit a time which has been read as a time of the arrival to the point calculation device,
wherein the preset movement distance is a distance when movement on a predetermined route movable within a single region having a predetermined width on both sides of the predetermined route has been performed using a preset route from the departure location to the arrival location as a center,
wherein the actual movement distance calculation unit calculates the actual movement distance by extracting only a part outside the single region among lines sequentially connecting the two points indicated by the two pieces of position information continuously measured in time series and calculating a total length of the part on the basis of the position information measured by the DGPS receiver from the time of the departure to the time of the arrival,
wherein the actual movement distance calculation unit calculates a total movement distance outside the single region of movement from the departure location to the arrival location,
wherein the point calculation unit calculates the first use points according to the calculated total movement distance outside the single region, and
wherein the point calculation unit determines, as the number of the first use points, a value obtained by subtracting a predetermined value from the number of the first use points calculated according to the difference between the preset movement distance and the actual movement distance when a difference between a scheduled departure time and a departure time of the vehicle is less than or equal to a predetermined threshold value and a difference between a scheduled arrival time and an arrival time of the vehicle is less than or equal to a predetermined threshold value.

2. The point calculation system according to claim 1, wherein the actual movement distance calculation unit calculates the actual movement distance by integrating a speed of the vehicle.

3. The point calculation system according to claim 1, wherein the actual movement distance calculation unit calculates the actual movement distance according to a trajectory of a position of the vehicle.

4. The point calculation system according to claim 1, wherein the actual movement distance calculation unit calculates a movement distance in an up-down direction in addition to a movement distance in a plane direction from the departure to the arrival in the calculation of the actual movement distance and adds the calculated movement distance in the up-down direction to the movement distance in the plane direction.

5. The point calculation system according to claim 1, wherein the point calculation unit calculates points according to a sum value of differences between the preset movement distance and actual movement distances at use times of the vehicle for a predetermined period.

6. The point calculation system according to claim 1, wherein the point calculation unit adds second use points calculated according to a time difference between a scheduled arrival time of the vehicle and an arrival time of the vehicle to the first use points.

7. The point calculation system according to claim 1, wherein the point calculation unit adds second use points calculated according to a time difference between a scheduled departure time of the vehicle and a departure time of the vehicle to the first use points.

8. The point calculation system according to claim 1, wherein the point calculation unit adds second use points calculated according to a time difference between a boarding time of the vehicle and a departure time of the vehicle to the first use points.

9. The point calculation system according to claim 1, wherein the point calculation unit adds second use points calculated according to a time difference between a deboarding time from the vehicle and an arrival time of the vehicle to the first use points.

10. The point calculation system according to claim 1, wherein the point calculation unit adds second use points calculated according to at least one of a grade of a card in which identification information of the user is recorded to be used by the user to record boarding on the vehicle, a grade of a passenger room used by the user in the vehicle, the number of times that the user boards the vehicle, the number of users pre-registered as users on board with the user when he/she boards the vehicle, a level of crowdedness of the vehicle in a section in which the user boards the vehicle, and a case in which the user has not deboarded the vehicle at a scheduled deboarding place to the first use points.

11. The point calculation system according to claim 1, wherein the point calculation unit calculates points for a case in which the vehicle is not operated when the vehicle is not operated.

12. The point calculation system according to claim 1, further comprising:
a shaking determination unit configured to acquire detection information of a vibration sensor mounted on the vehicle or weather information and determine a shaking of the vehicle according to the acquired information,
wherein the point calculation unit adds second use points calculated according to a time period during which the shaking determination unit determines that the vehicle is in a shaken state to the first use points.

13. The point calculation system according to claim 1, wherein the point calculation unit acquires a speed of the vehicle from the departure location to the arrival location of the vehicle at predetermined time intervals, calculates a distance of movement at a speed greater than or equal to a predetermined threshold value, and adds second use points calculated according to the distance to the first use points.

14. The point calculation system according to claim 1,
wherein, when the point calculation unit has calculated the second use points, the output unit outputs the second use points in addition to the first use points by distinguishing the second use points from the first use points.

15. A boat comprising:
the point calculation system according to claim 1.

16. A point calculation method comprising the steps of:
calculating, by a point calculation device of a point calculation system, an actual movement distance of a vehicle from departure to arrival;
calculating, by the point calculation device of the point calculation system, use points for the vehicle according to a difference between the actual movement distance and a preset movement distance from a departure location to an arrival location,
outputting, by the point calculation device of the point calculation system, the use points calculated in the step of calculating of the use points, and
displaying, by a monitor of the point calculation system, the use points output in the step of outputting,
measuring, by a DGPS (differential global positioning system) receiver of the point calculation device provided to the vehicle, position information of the vehicle,
transmitting, by a first communication device of the point calculation device provided to the vehicle, the position information of the vehicle measured by the DGPS receiver to the point calculation device at predetermined time intervals,
reading, by a second communication device of the point calculation device provided at the departure location, information from an IC card or a magnetic card which is possessed by a user boarding on the vehicle and transmitting a time which has been read as a time of the departure to the point calculation device,
reading, by a third communication device of the point calculation device provided at the arrival location, information from the IC card or the magnetic card which is possessed by the user deboarding from the vehicle and transmitting a time which has been read as a time of the arrival to the point calculation device,
wherein the preset movement distance is a distance when movement on a predetermined route movable within a single region having a predetermined width on both sides of the predetermined route has been performed using a preset route from the departure location to the arrival location as a center,
wherein, in the step of calculating the actual movement distance, calculating the actual movement distance by extracting only a part outside the single region among lines sequentially connecting the two points indicated by the two pieces of position information continuously measured in time series and calculating a total length of the part on the basis of the position information measured by the DGPS receiver from the time of the departure to the time of the arrival,
wherein a total movement distance outside the single region in the movement from the departure location to the arrival location is calculated in the step of calculating the actual movement distance,
wherein the first use points are calculated according to the calculated total movement distance outside the single region in the step of calculating the use points, and
wherein, in the step of calculating the use points, a value obtained by subtracting a predetermined value from the number of the use points calculated according to the difference between the preset movement distance and the actual movement distance is determined as the number of the use points when a difference between a scheduled departure time and a departure time of the vehicle is less than or equal to a predetermined threshold value and a difference between a scheduled arrival time and an arrival time of the vehicle is less than or equal to a predetermined threshold value.

* * * * *